(12) United States Patent
Takeuchi (10) Patent No.: US 7,088,824 B1
(45) Date of Patent: Aug. 8, 2006

(54) SINGLE-PHOTON-EMISSION APPARATUS

(75) Inventor: Shigeki Takeuchi, Sapporo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/719,157

(22) PCT Filed: Nov. 10, 1999

(86) PCT No.: PCT/JP99/06245

§ 371 (c)(1),
(2), (4) Date: Dec. 12, 2000

(87) PCT Pub. No.: WO00/62123

PCT Pub. Date: Oct. 19, 2000

(30) Foreign Application Priority Data

Apr. 12, 1999 (JP) ............................. 11/104608

(51) Int. Cl.
*H04K 1/00* (2006.01)

(52) U.S. Cl. ....................... 380/256; 713/201
(58) Field of Classification Search ................. 380/256; 713/201

See application file for complete search history.

(56) References Cited

U.S. PATENT DOCUMENTS

| 3,660,673 | A | * | 5/1972 | Anderson | .................... | 359/330 |
| 5,339,182 | A | * | 8/1994 | Kimble et al. | .............. | 398/158 |
| 5,406,409 | A | * | 4/1995 | Harlamoff et al. | .......... | 359/330 |
| 5,675,648 | A | * | 10/1997 | Townsend | .................... | 380/278 |

FOREIGN PATENT DOCUMENTS

| AU | 9457099 | 7/1994 |
| CA | 2152628 | 7/1994 |
| DE | 69309496 | 7/1994 |
| EP | 676110 | 7/1994 |
| ES | 2101495 | 7/1994 |
| JP | 08-505019 | 7/1994 |
| JP | 08-190112 | 7/1996 |
| WO | 9415422 | 7/1994 |

OTHER PUBLICATIONS

P. G. Kwiat, A. M. Steinberg, R. Y. Chiano, P. H. Eberhard, M. D. Petroff, "Absolute effeciency and time–response measurement of single–photon detectors", Appl. Opt., vol. 33, No. 10 (Apr. 1, 1994) pp. 1844–1853.

Shigeki Takeuchi, Abstracts, Meeting of Nippon Butsuri Gakkai, vol. 53, No. 1–2, 2p–YL–7, "Parametric Keiko Koshi Tai Beam no Hassei", p. 292 No Translation Provided.

Kaoru Sanaka et al., Abstracts, Meeting of Nippon Butsuri Gakkai, vol. 53, No. 2–2, 27a–YQ–10, "Hikari Doharo gata Hi Senkei Soshi ni yoru 2 Koshi Sokan Gensho", p. 341 No Translation Provided.

* cited by examiner

*Primary Examiner*—Kim Vu
*Assistant Examiner*—James Seal
(74) *Attorney, Agent, or Firm*—Oblon, Spivak, McClelland, Maier Neustadt, P.C.

(57) ABSTRACT

The apparatus includes a photon pair source for generating a photon pair that contains a signal photon and an idler photon and correlates with the generating time, photon detectors for detecting a incidence of idler photons, a clock generator, a gate device controller for generating signals for opening or closing a gate device in a frequency lowering a specific number of times within a specified time defined by the clock, and a gate device for opening or closing the gate in response to the signals from the gate device controller.

10 Claims, 9 Drawing Sheets

SINGLE-PHOTON-EMISSION APPARATUS

TECHNICAL FIELD

The present invention relates to a photon source used for as an example, quantum cryptographic communication system, a transmission system that enables the detection of an unauthorized listener by loading each photon with information.

BACKGROUND ART

In the quantum cryptographic communication system, loading each photon with information enables the detection of an unauthorized listener by the quantum mechanical principle. However, if the same information is loaded on two or more photons, the unauthorized listener may utilize a part of these photons and the presence of the unauthorized listener may not be able to be detected. In this way, ideally, a pulse that contains only one photon at maximum must be used. For this kind of pulse, it is popularly practiced to attenuate the light beam from the laser beam source by an attenuator in such a manner that the mean number μ of photons per pulse becomes about 0.1. By doing this, the probability to contain two or more photons in a pulse can be reduced. However, the probability to contain one photon in the pulse is also reduced to about 0.1. That is, in the case of $\mu=0.1$, transmission is actually carried out only about once per 10 times.

Figure 9:
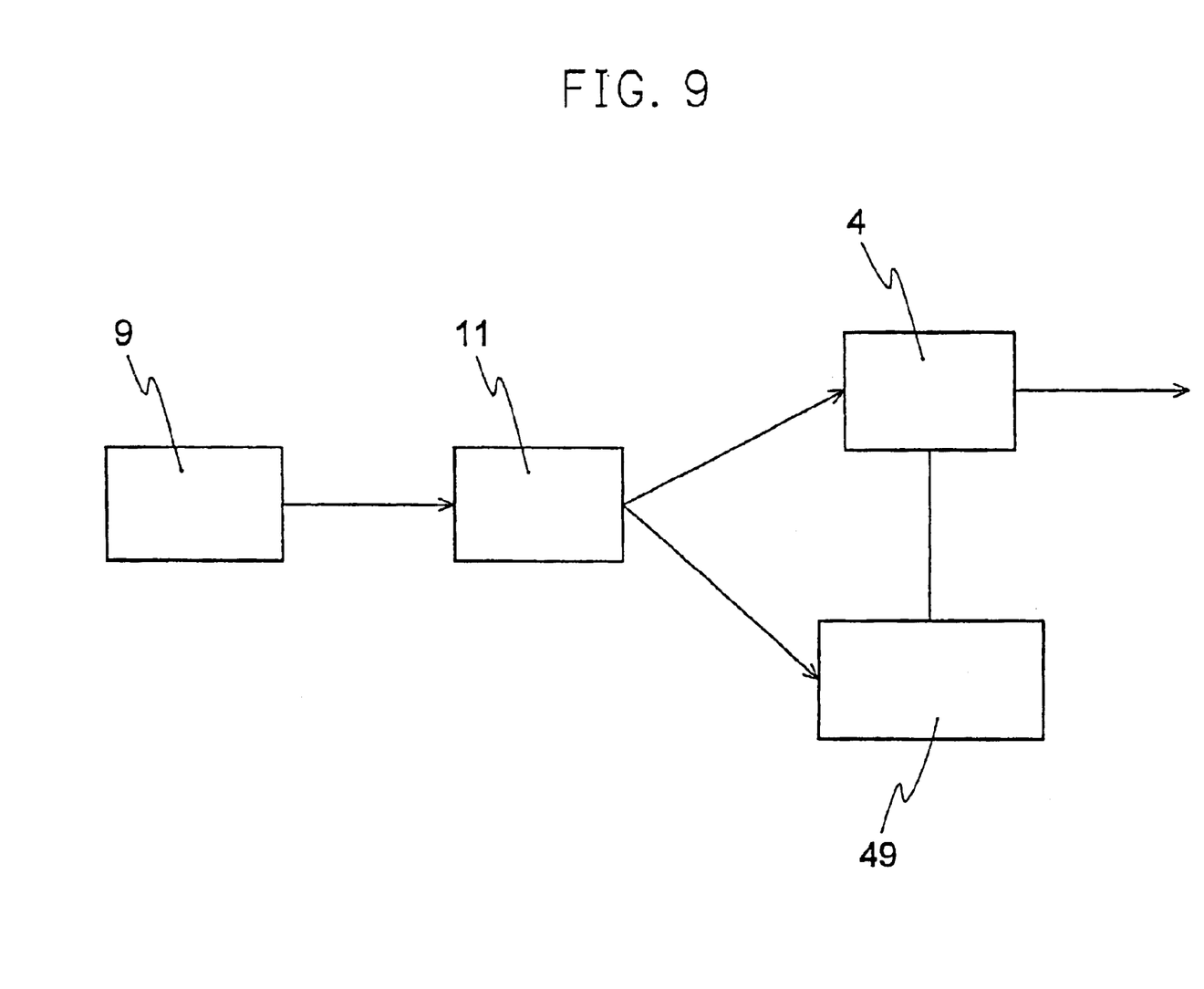
FIG. 9 is a general arrangement drawing of one example of conventional techniques.

Referring now to FIG. 9, description will be made on the case stated in the "Key Distribution system and method using Quantum Cryptography" of Japanese Unexamined Patent Publication No. 505019/1996 as one example of conventional techniques for improving this kind of process. In FIG. 9, numeral 9 denotes a laser that generates pumping light for pumping the nonlinear optical crystal 11. In the nonlinear optical crystal 11, a parametric fluorescence pair that causes one photon of the pumping light to stochastically generate two photons is generated. One photon of these (in this case, called the "idler photon") is detected by an optical detector and a gate controller 49, and when detected, the gate device 4 is opened to enable the other photon (called the "signal photon") to pass.

However, in the conventional technique, there are following problems.

First of all, the conventional method has a drawback in that if two photon pairs exist within the response time of the detector, two signal photons are emitted by a gate operation and two photons exist in a pulse.

In the conventional method, it was unable to control the timing of photon generation within the pulse.

When the detector for detecting the arrival of the photon generates a so-called "dark count pulse," that is, when the detector outputs pulses due to noises, etc. even when it does not detect the photon, it outputs non-existent light pulse in which no emission photon exists and provided poor efficiency.

The present invention has been made to solve these problems, and it is an object of the present invention to generate only one photon in one pulse.

It is another object of the present invention to reduce generation of non-existent beam pulse due to dark count pulse of the detector.

It is yet another object of the present invention to generate the photon at a specific timing.

DISCLOSURE OF INVENTION

A single photon generating apparatus according to the present invention comprises a photon pair source for generating a pair of photons consisting of a signal photon and an idler photon that correlate with a generating time, a photon detector for detecting an incidence of the idler photon, a clock generator, a gate device controller for generating the signal for operating a gate device for the number of times less than a specific number of times within a predetermined time defined by the clock, and a gate device that opens and closes response to the signal from the gate device controller.

It also comprises a photon pair source for generating a pair of photons consisting of a signal photon and an idler photon that correlate with a generating time, a photon detector for detecting the incidence of the idler photon, a clock generator, a gate device controller for generating the signal for operating the gate device only against a first signal from the photon detector within a predetermined time defined by the clock, and a gate device that opens and closes in response to the signal from the gate device controller.

For the nonlinear optical medium on which a pumping light is incident, a nonlinear optical crystal is provided, in which the angle made by the pumping light and an optical axis of the nonlinear optical medium is set to the angle at which tuning curves come in contact with a straight line that corresponds to a specific single wavelength a.

For the nonlinear optical medium on which a pumping light is incident, a nonlinear optical crystal is provided, in which the angle made by the pumping light and the optical axis of the nonlinear optical medium is set to an angle at which tuning curves come in contact with two straight lines that correspond to two specific wavelengths a and b.

In addition, for a nonlinear optical medium on which a pumping light is incident, a wave guiding channel type nonlinear optical medium is provided.

Furthermore, for a nonlinear optical medium on which a pumping light is incident, pseudo-phase matching type nonlinear optical medium is provided.

In addition, as a gate device for controlling an emission of the signal photon, a plurality of shutters for closing or opening in a time difference shorter than a gate opening or closing time are equipped.

In addition, an optical fiber for allowing the signal photon caused of the photon pair to reach the gate device for controlling the emission of the photon is equipped.

In the present invention, an incidence of the idler photon is detected by a photon detector and the gate device is opened or closed for controlling the emission of the signal photon for the number of times less than the specific number of times within the predetermined time defined by the clock from the clock generator.

In addition, the incidence of the idler photon is detected by a photon detector, and a gate device is opened or closed for controlling the emission of signal photon only for the first signal from the photon detector within the predetermined time defined by the clock from the clock generator.

In addition, the pumping light from the pumping light source is allowed to be incident and a photon pair which are generated by the nonlinear optical medium that correlate with the generation time is used as an idler photon and a signal photon.

In addition, in installing the nonlinear optical medium on which the pumping light is incident, the angle made by the pumping light and the optical axis of the nonlinear optical medium is set to an angle in which tuning curves come in contact with a straight line that corresponds to a specific single wavelength a.

In addition, in installing the nonlinear optical medium on which the pumping light is incident, the angle made by the pumping light and the optical axis of the nonlinear optical medium is set to an angle in which tuning curves come in contact with two straight lines that correspond to two specific wavelengths a and b.

In addition, the pumping light is allowed to be incident to the wave guiding channel type nonlinear optical medium.

In addition, the pumping light is allowed to be incident to the pseudo phase matching type nonlinear optical medium.

The emission of signal photons is controlled by a plurality of shutters that open or close in a shorter time difference than the open or close time of the shutters.

In addition, the signal photon caused of the photon pair is allowed to reach the gate device that controls the emission of the photon by the use of optical fiber.

BEST MODE FOR CARRYING OUT THE INVENTION

Embodiment 1

Figure 1:
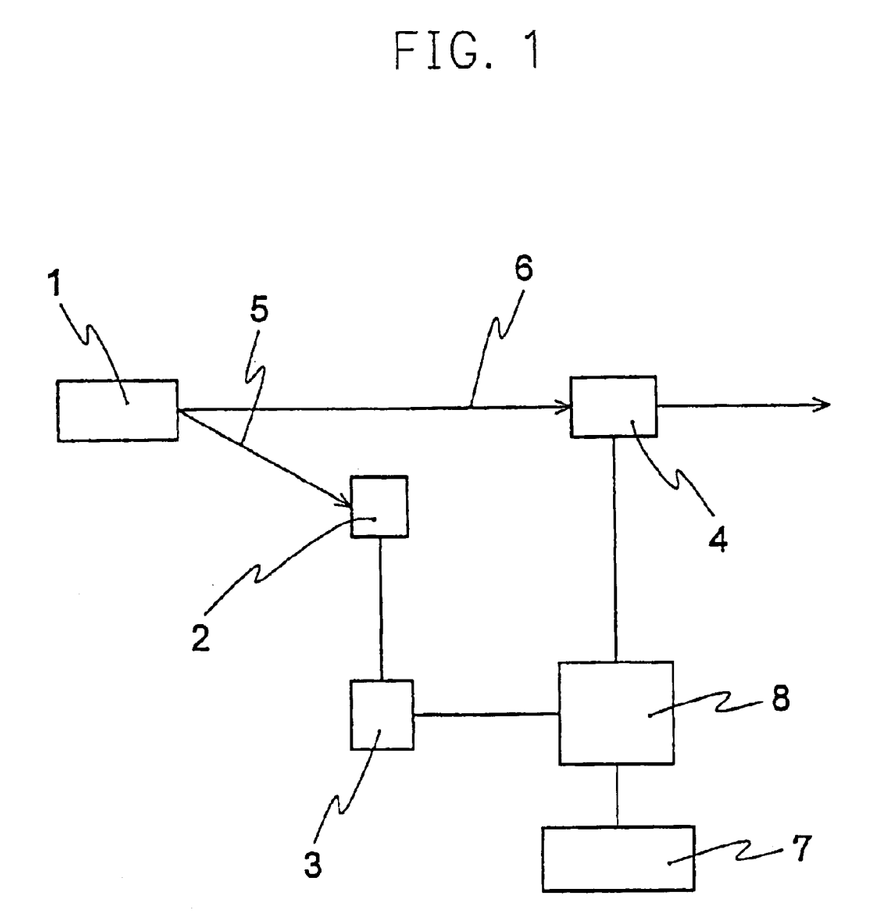
FIG. 1 is a general arrangement drawing of one embodiment according to the present invention.

FIG. 1 is a general arrangement drawing of one embodiment of the invention. In FIG. 1, numeral 1 denotes a photon pair source that generates a photon pair that correlate with the generation time, numeral 2 denotes a photon detector for detecting the idler photon 5, numeral 3 denotes a differential circuit for differentiating the signal pulse generated from the photon detector, numeral 8 a gate device controller section for controlling the gate device 4 in response to the signal from the differentiation circuit 3 and the control clock from the clock generator 7.

Figure 2:
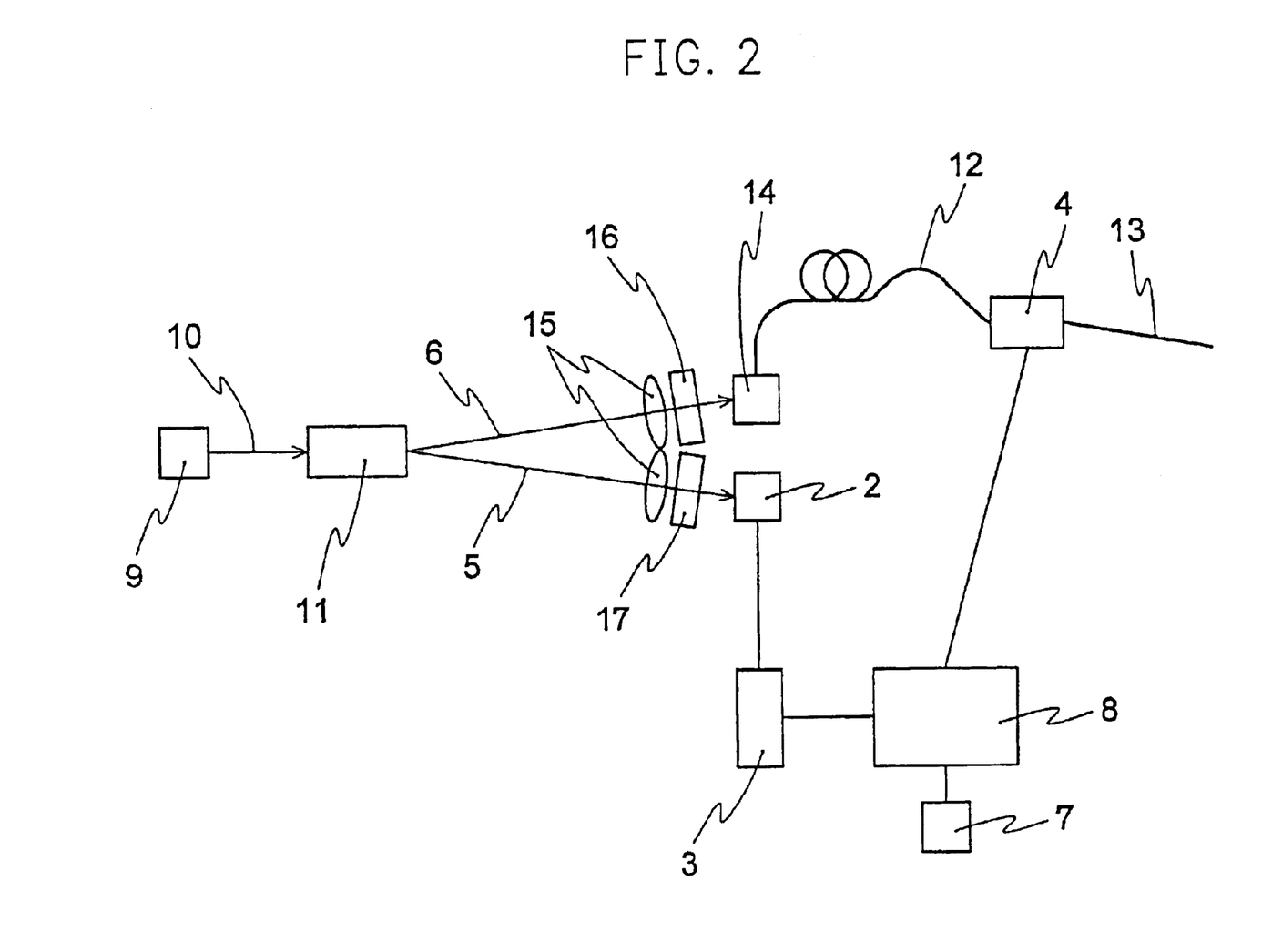
FIG. 2 is a general arrangement drawing of one embodiment of the present invention.

FIG. 2 shows a detailed configuration of the present embodiment. In this embodiment, an optical pulse that contains only single photon is efficiently generated at a specific timing in the clock.

(Description on Photon Pair Generator)

In FIG. 2, numeral 9 is a light source of pumping light 10 for pumping the nonlinear optical medium 11. In the nonlinear optical medium 9, the idler photon 5 and the signal photon 6 that have wavelength 2λ, double the wavelength λ of pumping light 10, are generated by down conversion. In this embodiment, argon laser that has 351.1 nm wavelength is used for the pumping light source 9. In this event, the idler photon 5 and the signal photon 6 are generated as a pair, the sum of whose energies generated is equivalent to the energy of the photon of 351.1 nm wavelength, that is, a photon of 702.2 nm wavelength, respectively.

Figure 3:
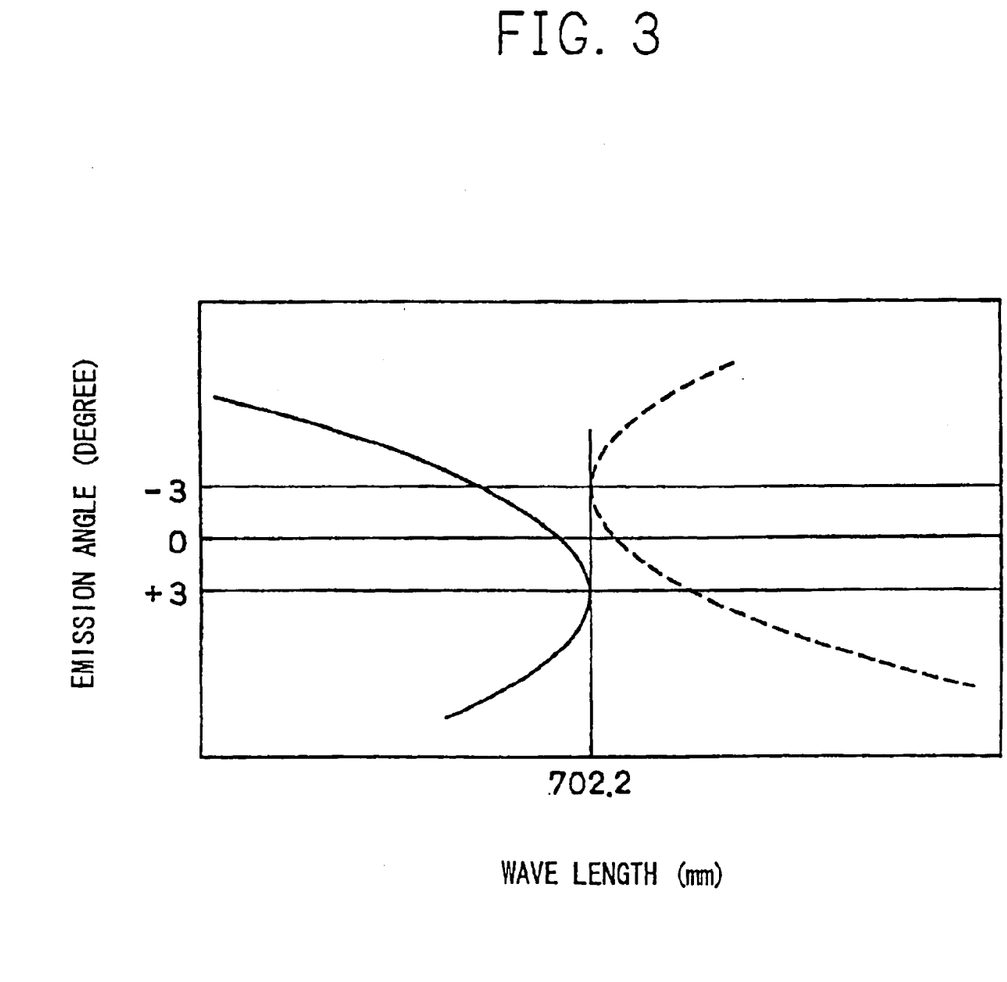
FIG. 3 is a drawing showing the relationship between the wave length and emission angle of photons generated in the nonlinear optical medium.

As described in detail in the Japanese Patent Application No. 353078/1997 "Photon Beam Generator," setting the optical axis of the nonlinear optical medium to a specific angle with respect to the pumping light enables the idler photon 5 and signal photon 6 to be generated in a form of beam as well as in a high efficiency. FIG. 3 shows a tuning curve when the optical axis of β-Barium-Boron-Oxide (BBO) crystal is set to the angle of 50.4° with respect to the pumping light. In FIG. 3, the wavelength of the photon generated is taken as abscissa and the emission direction of the photon with respect to the incident direction of the pumping light is taken as ordinate. As seen in the figure, two tuning curves come in contact with a straight line that corresponds to the 702.2 nm wavelength. Under this condition, a 702.2-nm wavelength fluorescent pairs are emitted in a form of beam in directions of plus 3° and minus 3°, respectively. By using this kind of nonlinear optical medium, photon pairs are generated efficiently with respect to the incident power of the pumping light, and as a result, when the single photon is generated at an equivalent rate, it is possible to suppress the power consumption of the equipment to a low level.

The idler photon 5 is focused by a lens 15, and converged into the photon number detector 2 through the filter 17 that selectively penetrates the photon of 2λ wavelenght.

(Description on Photon Detector)

In this embodiment, as a photon detector 2, SPCM-AQ commercially available from SEIKO EG&G was used. This photon detector has an avalanche photo-diode (APD) driven in the Geiger mode of active quenching as a photo-receiving element. APD causes the breakdown state in which when a voltage exceeding a specified voltage (breakdown voltage) is applied, incidence of only a single photon causes the internal carrier induced by the incidence to be accelerated by the applied voltage and repeats the process for exciting other carriers endlessly. Under this condition, it is unable to detect the incidence of the next photon. Quenching is to lower the applied voltage to APD to lower than the breakdown voltage, to end the breakdown state, and to enable the detection of the incidence of the next photon. It is called passive quenching to simply insert passive elements such as serial resistor to the voltage supply portion and provide such effects, while it is called active quenching to use an amplifier, etc. to carry out such control actively. In the SPCM-AQ, the dead time of the detector which is the time to enable the detector to detect the next photon after the previous photon incidence is about 100 ns and the output pulse width is about 9 ns. Needless to say, a passive quenching photon detector may be used.

(Description on the Control Method)

Figure 4:
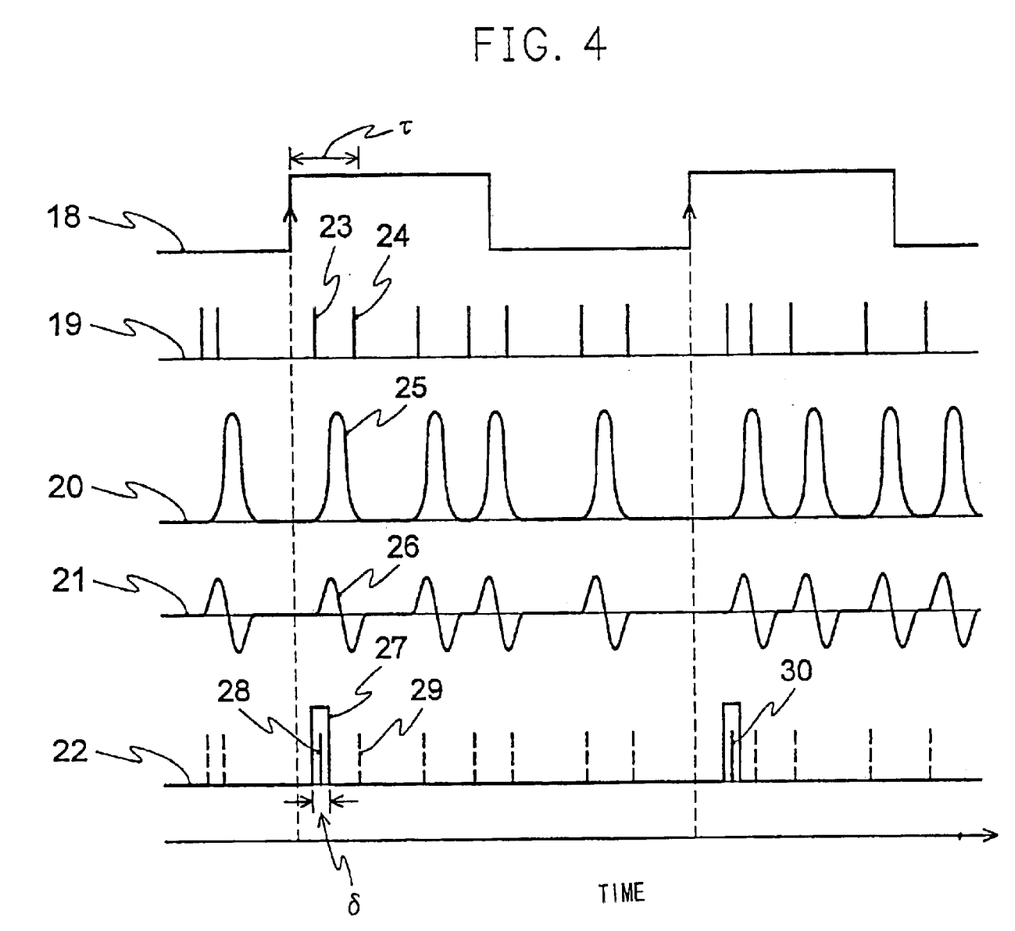
FIG. 4 is a schematic drawing for explaining the operation of one embodiment of the invention.

Referring now to FIG. 4, description will be made on the operations of the differential circuit 3, clock generator 7, and the gate device controller section 8 for controlling the gate device 4 when the idler photon 5 is incident on the photon detector 2. In FIG. 4, numeral 18 is a clock pulse outputted from the clock generator, numeral 19 is a graph showing the incident time of the idler photon 5 on the photon detector 2, numeral 20 is a graph showing an aspect of the signal pulses outputted from the detector 2, numeral 21 is a graph showing the output signal from the differential circuit, and numeral 22 is a graph showing output signals, etc. from the gate device controller section.

In the present embodiment, an operation for outputting a light pulse that contains only one photon during the predetermined time τ from the rise-up of the clock pulse shown with numeral 18, and for not outputting photons during the period other than that has been achieved.

The idler photon 5 should be so set to provide a sufficiently high probability of being generated during the time τ. That is, let N denote the average number of idler photons generated per second, the idler photon 5 shall be set to satisfy $N>1/\tau$. The time τ serves as an index of the periodicity of photon output, and in order to increase the periodicity, τ should be set to be small and N should be set to large accordingly.

As the idler photon is incident at each time as seen in numeral 19, a signal pulse series as seen in numeral 20 is outputted from the detector 2. For example, if the photon incidence takes place at the time 23, the pulse 25 is outputted from the detector 2 in conformity with this, but for the photon incidence at the time 24 right after, no pulse is generated if it is within the dead time of the detector. The pulse 25 generated is converted to a differential signal like numeral 26 by the differentiation circuit. For the signal to trigger the gate device controller section, the output pulse 25 from the photon detector may be directly used, but using this kind of differential signal 26 as a trigger, it is possible to suppress the fluctuation of the photon detection time due to the fluctuation of the form of signal pulse 25.

In the gate device controller section 8, a control signal 27 for opening the gate device 4 only for a short time δ is generated in response to the trigger of the first differential signal 26 after the rise-up of the clock pulse 18. The penetration time at the gate device 4 of the signal photon 6 corresponding to the idler photon 5 is shown with bars of dotted lines and solid lines in the graph 22. Because the signal pulse by the idler photon 5 delays by the signal processing time of the electronic circuit, the signal photon is delayed by the same time with a delay means, but FIG. 4 describes the control method without showing this. In the gate device 4, the signal photon 28 is able to penetrate, but by shortening the opening time δ of the gate device, it is possible to suppress the emission of the succeeding signal photon 29 and other signal photons in the clock. In the next clock, the signal photon 30 is emitted in the similar manner.

This signal photon 6 is focused by the lens 15 and is converged to the optical fiber 12 while being allowed to pass the filter that selectively penetrates the photon of wavelength 2λ. Numeral 14 is a fine alignment device for allowing the signal photon 6 to efficiently incident on the optical fiber 12.

The length of the optical fiber 12 is set in such a manner as required by the time necessary for signal processing as described referring to FIG. 4 so that the photon is transmitted to the gate device 4. The fine adjustment of the time is enabled by adjusting the length of the optical fiber 12 or by the signal delay unit equipped to the gate device controller section 8, etc.

By the above configuration, there achieved is a single photon source that outputs a light pulse that contains only one photon during a predetermined time τ from the rise-up of the clock pulse and that does not output any photon during the time other than the above.

Now, it is extremely useful to output the clock signal 18 shown in FIG. 4, signal pulse 25, control signal 27, or differentiation signal 26 to the outside. The clock signal 18 is able to be used as a signal for controlling the total system of the quantum cryptographic communication system. Or it is also possible to provide the clock generator section 7 by the clock supplied from the outside or to synchronize.

The photon receiver in the quantum cryptographic communication system is able to receive the signal photon separating from other noise signals by shortening the opening time of the gate device on the receiver side by the use of the signal pulse 25 or differentiation signal 26.

In the present embodiment, the first photon only from the rise-up of the clock was penetrated, but if a preset counter that is set by a clock 18 and is reset when the output pulse reaches the preset number N is used, it is possible to output N pieces of photon in a clock. In such event, it is possible to generate the state in which N photons are contained in a predetermined time.

In the present embodiment, continuous oscillation beam (CW beam) is used for the pumping light 10, but pulse beam may be used as a pumping light. In addition, it is also possible to generate the idler photon 5 and the signal photon 6 more efficiently by installing a mirror for reflecting the pumping light before and after the nonlinear optical medium 11 and configuring a cavity.

Embodiment 2

Figure 5:
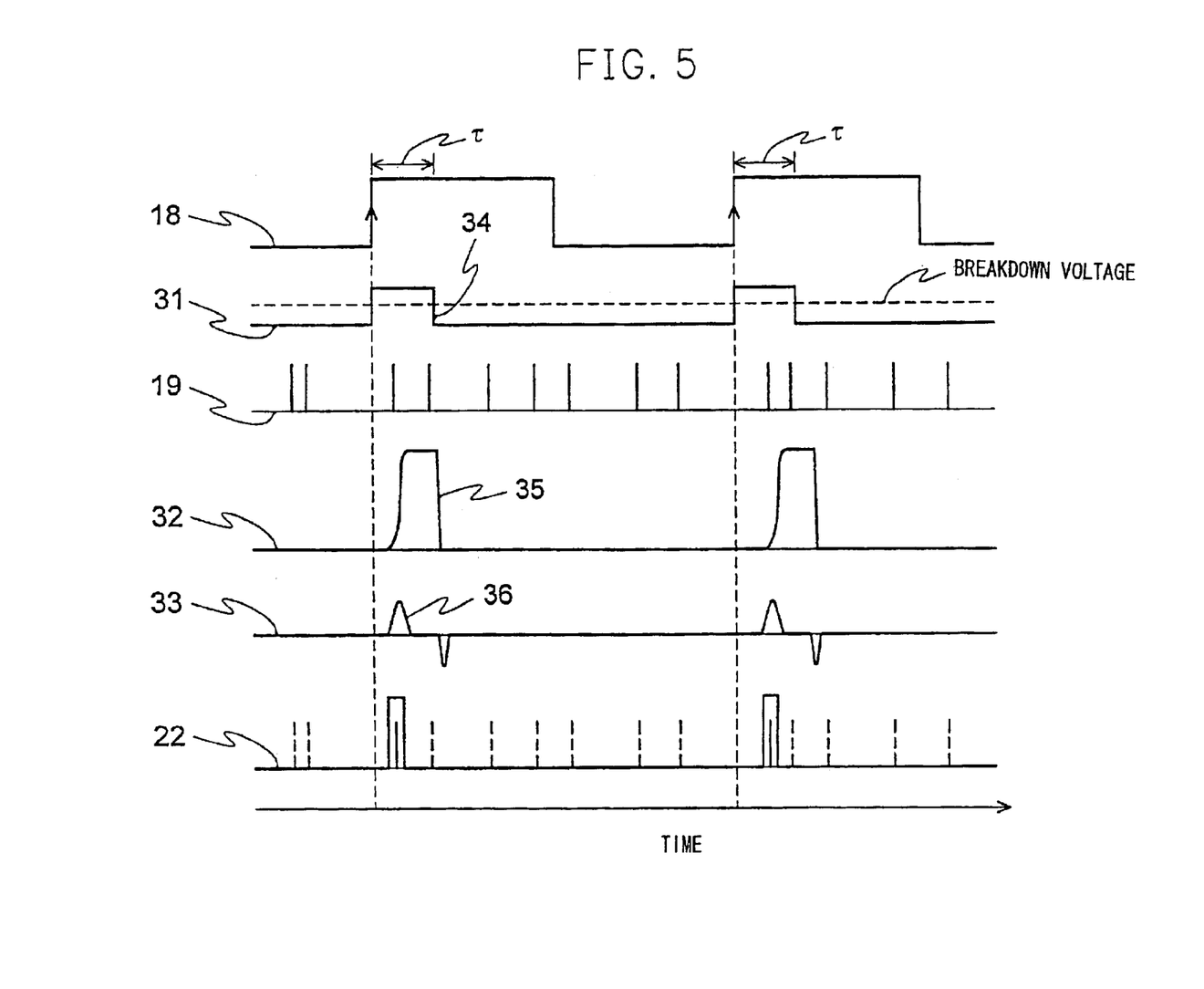
FIG. 5 is a schematic drawing for explaining the operation of one embodiment of the invention.

In Embodiment 1, APD of active quenching control was used as a detector 2, but it is also possible to apply voltage for a predetermined time in place of constantly applying voltage exceeding the breakdown voltage to APD. Referring now to FIG. 5, the control condition of such case is described. In FIG. 5, numeral 31 is a graph showing changes of voltage applied to APD with time, numeral 32 a graph showing the signal pulse from APD, and numeral 33 a graph showing differentiation signals outputted from the differentiation circuit 3.

In Embodiment 1, as described in the section about the active quenching, when the voltage higher than the breakdown voltage is applied to APD, APD has the infinite multiplication to incidence of one photon, and the output of APD enters the saturated breakdown state. In the present embodiment, the voltage applied to APD is controlled in conformity with the clock 18.

For the period from clock rise-up to about time τ as seen in Numeral 18, the applied voltage is brought to the condition higher than the breakdown voltage (34). During this period, as soon as a photon to incident, APD enters the breakdown condition, the output is saturated, and the condition persists until the applied voltage becomes lower than the breakdown voltage. Consequently, from APD, the output pulse like numeral 35 is obtained. With the rise-up of the differentiation signal 36, the gate device controller section 8 is triggered and the single photon is able to be cut out.

When APD of active quenching control is used, it is difficult to shorten the dead time or pulse length because of the limitation by the circuit used for quenching, and it has been difficult to make the 1-clock time shorter than the dead time or pulse length of the detector, but this method has made it possible to achieve a shorter clock time.

Embodiment 3

In Embodiment 1, the wavelength of signal light generated was 702.2 nm, but needless to say, this wavelength is able to optionally changed by selecting a suitable pumping light source laser and nonlinear optical medium. For example, it is naturally possible to generate wavelengths in the vicinity of 1550 nm, 1310 nm and 800 nm, which are generally adopted to communication using optical fiber.

The method for generating a photon pair shown in Embodiment 1 (FIG. 3) is a method suited to obtain a photon pair beam with equal wavelengths and small angular dispersion, but it is possible to obtain a photon pair with different wavelengths by changing the optical axis direction of the BBO crystal for other object of use. In such event, the two tuning curves as shown in FIG. 3 come in contact with straight lines that correspond to different wavelengths, respectively. In such event as well, the photons are taken out at an angle, in which the tuning curves as shown in FIG. 3 come in contact with the straight lines that correspond to the respective wavelengths. According to this condition, photons that generally expand in a form of cone are converged into one beam and the photon beam with high distribution density is able to be obtained.

For other embodiments of the invention, there is a device for generating a 532-nm pumping light 10 using an up-conversion laser of a semiconductor excited Yag laser as a pumping light source 9 in FIG. 2, and generating a 1310-nm photon as a signal photon 6 and a 896-nm photon as an idler photon 5. In such event, by the method described in detail in the Japanese Patent Application No. 353078/1997 "Photon Beam Generator," the angle made by the optical axis of the nonlinear optical medium is set to such an angle that the tuning curve comes in contact at 1310 nm and 896 nm, respectively, in order to improve the photon pair generating efficiency. In addition, by setting the wavelength of the idler photon to a near infrared area close to the wavelength of visible light, the number of photons is able to be detected with high quantum efficiency of the photon number detector 2.

With this king of configuration, it is able to generate photons in the vicinity of 1310 nm with a small tranmission loss in the optical fiber within a specific time $\tau$ in such a manner as to prevent two photons from existing densely in said time $\tau$. In the present embodiment, it becomes possible to efficiently generate the photon pair by setting the crystal angles as described above, and it becomes also possible to maintain the high detection efficiency of the number of idler photons, and as a result, the power consumption of the device is able to be reduced.

Embodiment 4

Figure 6:
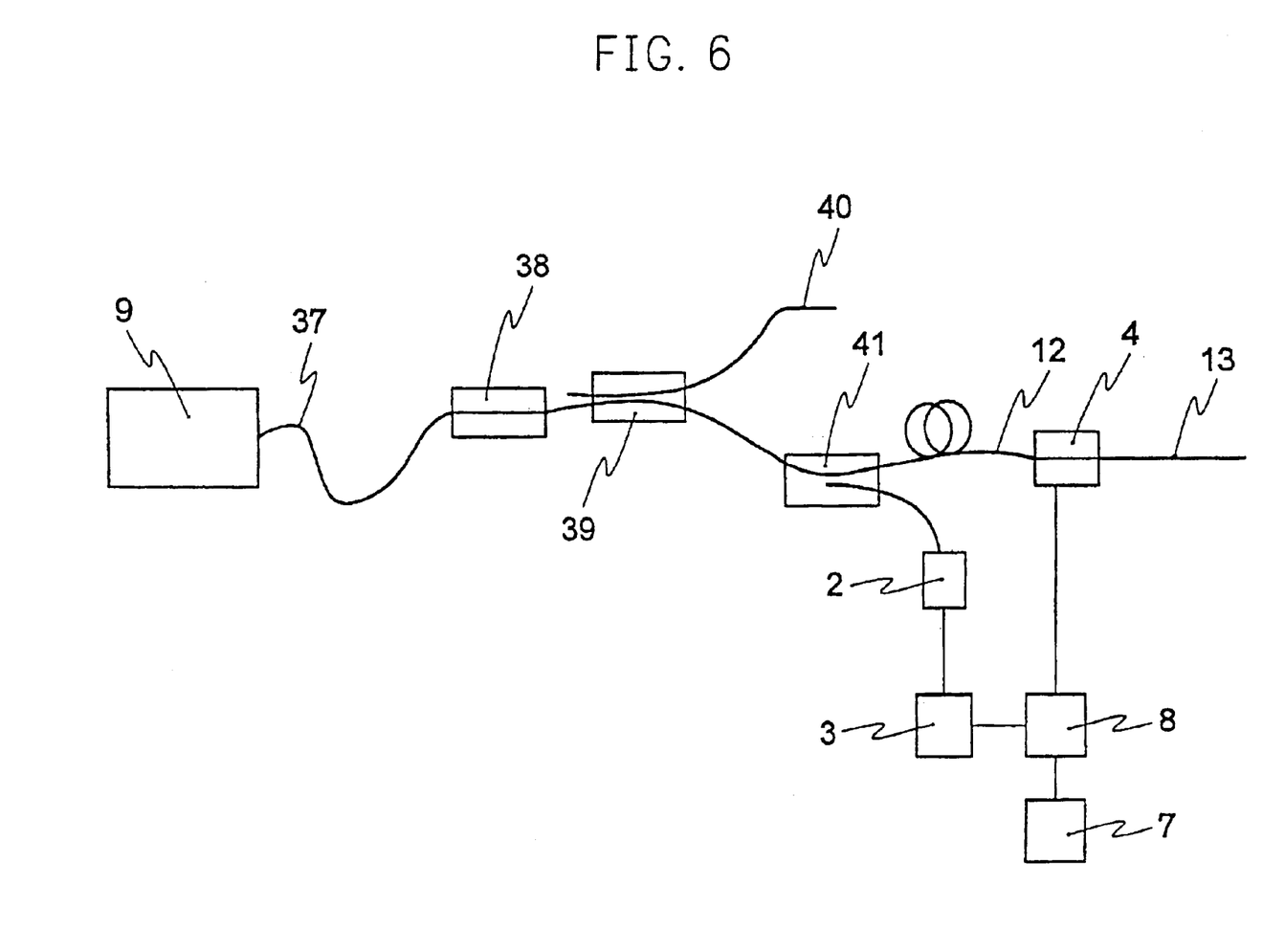
FIG. 6 is a general arrangement drawing of one embodiment of the invention.

FIG. 6 shows another embodiment of the present invention. In this embodiment, numeral 9 is a pumping light source for pumping the guide-wave channel type nonlinear optical substance 38, numeral 37 an optical fiber for guiding the pumping light, numeral 39 a wave-guide channel type nonlinear medium, numeral 41 a wave-guide channel type filter for discriminating the fluorescent pair and pumping light generated from the wave-guide channel type nonlinear optical medium 39, numeral 40 an emission port of pumping light, and numeral 41 a wave-guide channel type filter for dividing the fluorescent pair into two branches.

In this embodiment, the parametric fluorescent pair is generated in the wave-guide channel type nonlinear optical medium 39. The fluorescent pair has vertical and horizontal polarized lights, respectively, and in the wave-guide type filter 41 that operates as a polarizing beam splitter, that with one of the polarized light pair is transmitted to the photon number detector 2 and another to the optical fiber 12.

By this kind of configuration, it becomes possible to downsize the device, and optical alignment is no longer required.

In this kind of embodiment, as the nonlinear optical medium, a wave-guide channel type nonlinear optical medium 39 is used. As described by "two photon correlation phenomenon by optical wave-guide channel type nonlinear type element" written by Sanaka et al. in Page 341, the second separate volume, No. 2, Volume 53, of the Proceedings of the Japanese Society of Physics, in the pseudo phase matching type wave guide channel nonlinear medium, a nonlinearity that can satisfy conditions in which the pumping light used and the photons generated are generated in parallel can be obtained by pseudo phase matching.

With this, wavelengths of pumping light and generated photon are able to optionally chosen.

Of course, in this embodiment, a pulse light source and a CW light source can be used as the pumping light source 9. By installing mirrors which reflects the pumping light at the front and the rear of the guide-wave channel type nonlinear optical substance 38 and configuring the cavity, it is possible to produce an idler photon and a signal photon more effectively.

Embodiment 5

Figure 7:
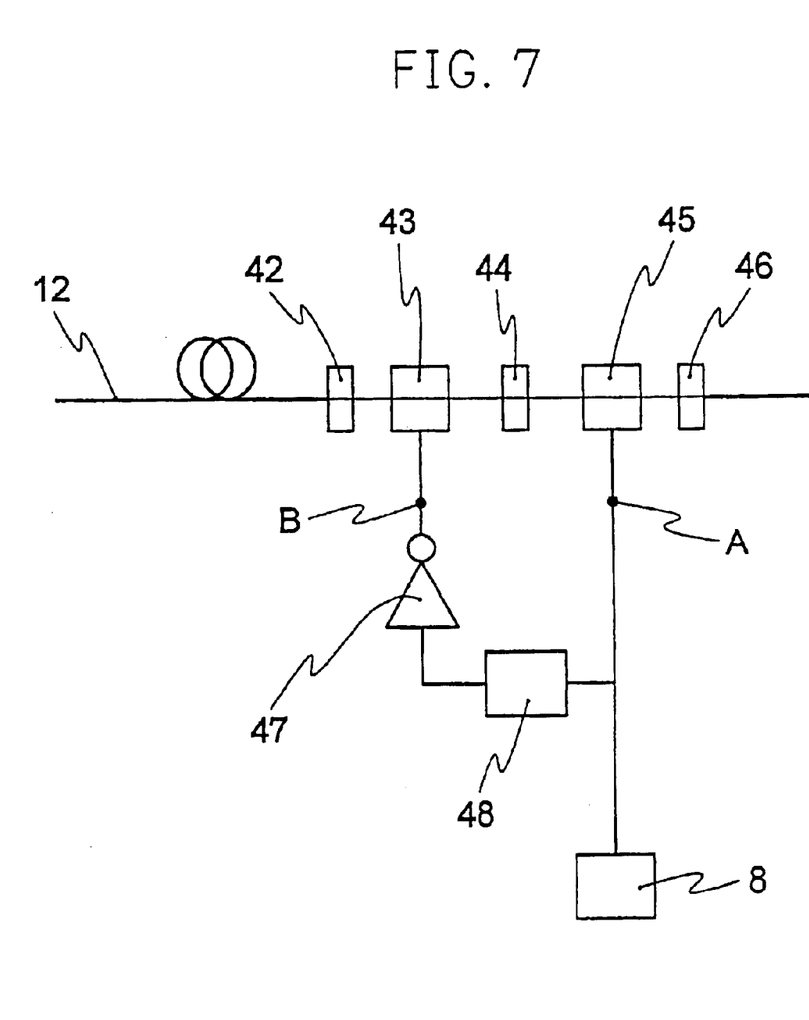
FIG. 7 is an arrangement drawing of a gate device used in one embodiment of the invention.

For yet another embodiment of the invention, FIG. 7 shows a case in which two shutters are equipped to the gate device 4 of FIG. 2. In FIG. 7, numeral 12 denotes an optical fiber for delaying the signal photon in the reaching time to the gate device, numerals 43, 45 denote electro-optic elements, numerals 42, 44, 46 denote polarizing plates, numeral 47 denotes a NOT gate, numeral 48 denotes a delay device, and numeral 8 denotes a controller. In this event, polarizing plates 44 and 46 are set in such a manner that they have the maximum transparency for the polarization of the light that has passed the polarizing plate 42 and do not transmit the light which has polarization crossing at right angles to said light. In addition, the electro-optic elements 43, 45 rotate the polarization 90° when the logic of the control signal given is 1 and does not rotate the polarization when the logic is 0. It is possible to configure the shutter by a pair of polarizing plates and an electro-optic element that rotates the polarization sandwiched between the pair, but in the present embodiment, the polarizing plate 44 is used in common by the two shutters.

The gate device preferably holds the gate open condition only while the photon is present, and is closed during other periods. Electro-optical elements generally have a fast response time by nature. However, with a single electro-optic element, the gate time was unable to be set to the time less than that specified by the repetitive response time of the electro-optic element. The present embodiment has achieved the gate operation shorter than the repetitive response time of the shutter by installing two shutters.

Figure 8:
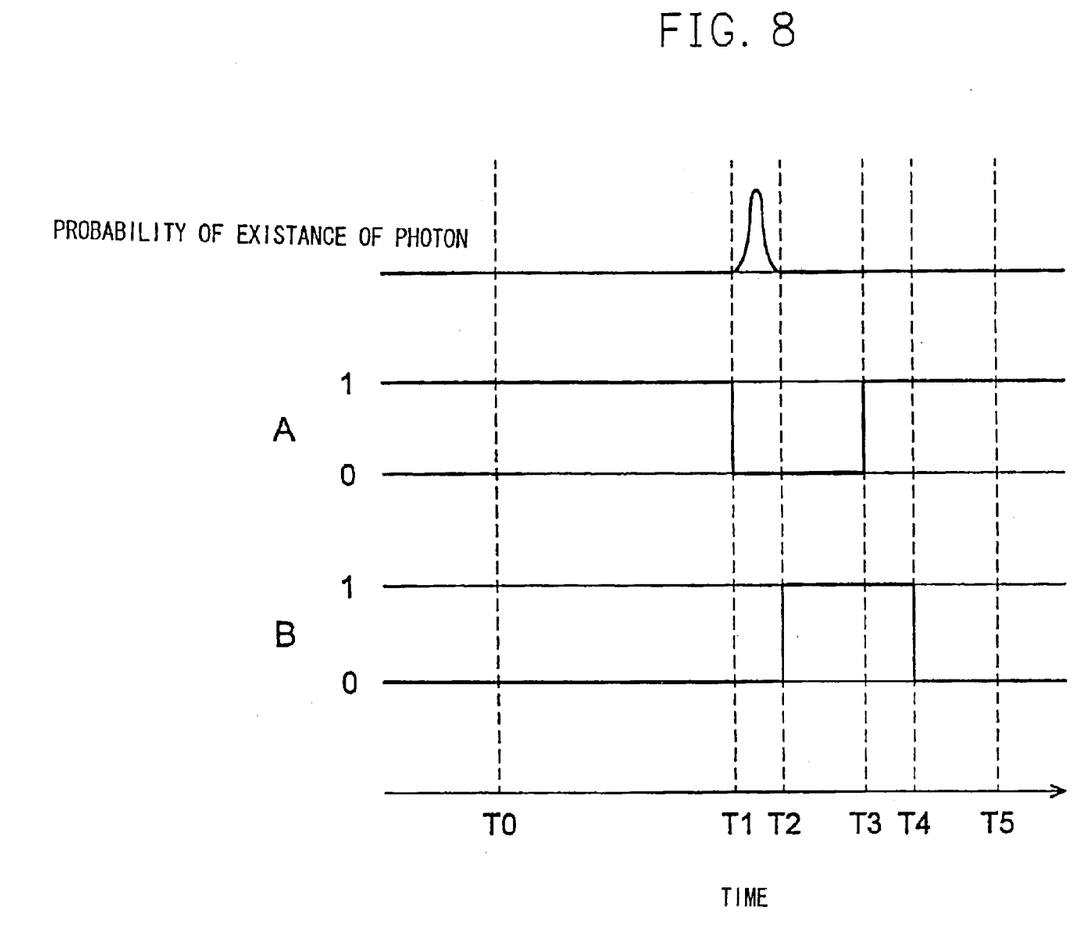
FIG. 8 is a schematic drawing for explaining operation of the gate device used in one embodiment of the invention.

Referring now to FIG. 8, operation of the gate circuit is described. In FIG. 8, time is plotted in abscissa. The graph at the top indicates the probability in which the desired photon number state reaches the gate operating section, Graph A the signal at point A of FIG. 7, and Graph B the state of signal at point B of FIG. 7 in the similar manner. Denotation A may be considered as the control signal itself from the controller. The electro-optical element 45 transmits the photon when the logic 0 is entered and shields the photon when the logic 1 is entered in, combinations with polarizing plates 44, 46.

The electro-optic element 43 operates in the same way in combinations with polarizers 42, 44.

As in the state at time T0 of graph A of FIG. 8, the control signal from the controller is usually set 1. In this case, the gate device does not transmit the photon by the electro-optical element 45. In this event, to the electro-optical element 43, logic 0 is entered by the NOT gate 47, and photon is allowed to be transmitted.

The controller 8 changes the output logic from 1 to 0 so that the electro-optic element 45 opens at the time T1 right before the time when the photon is expected to reach the gate operating section. In this event, by the operation of the delay unit 48, the electro-optical element 43 is kept to logic 0. In such event, the photon is ready to penetrate the gate device. This state continues for the time set by the delay unit. After the delay, at T2, the logic to the electro-optic element flips to 1 and the photon is unable to penetrate the shutter configured by the electro-optic element 43. At time T3, the control signal again changes from 0 to 1, causing the electro-optic element 45 to change to closed state, and at T4, it returns to initial state.

By the above-mentioned configuration, it is possible to open the gate device only for an extremely short time, rendering itself capable for selectively emitting the required photons only.

In the present embodiment, the shutter was configured by the use of electro-optical elements, but needless to say, it is possible to use other shutters. For example, if a light-light switch is used, still faster shutter operation is able to be achieved. When an acousto-optical element is used, a shutter faster than the repetition speed is able to be formed inexpensively. It is also possible to use a mechanical shutter.

The single photon generating apparatus related to the first configuration of the present invention is able to generate photons of a number lowering a specific number within a predetermined time after a clock pulse is built up, because it comprises a photon pair source for generating a pair of photons comprising a signal photon and an idler photon that correlate in the generation time, a photon detector for detecting the incidence of the idler photon, a clock generator, a gate device controller section for generating signals for opening or closing a gate device only by the frequency lowering the specific number of times within the predetermined time defined by the clock, and a gate device for operating or closing in response to the signal from the gate device controller section.

The single photon generating apparatus related to the second configuration of the present invention is able to generate only one photon within a predetermined time after a clock pulse is built up, because it comprises a photon pair source for generating a pair of photons comprising a signal photon and an idler photon that correlate in the generation time, a photon detector for detecting the incidence of the idler photon, a clock generator, a gate device controller section for generating signals for opening or closing a gate device only in response to a first signal from the photon detector within the predetermined time defined by the clock, and a gate device for operating and closing in response to the signal from the gate device controller section.

The single photon generating apparatus related to the third configuration of the present invention is able to efficiently generate photons of a number lowering a specific number or only one photon within a predetermined time after the clock pulse is built up, because it is equipped with, as a photon pair source, a pumping light source and a nonlinear optical medium on which the pumping light is incident, in either the first or the second configuration.

The single photon generating apparatus related to the fourth configuration of the present invention is able to efficiently generate a photon pair of a specific single wavelength because, as a nonlinear optical medium on which the pumping light is incident, a nonlinear optical crystal is equipped, for which the angle made between the pumping light and the optical axis of the nonlinear optical crystal is set to an angle in which tuning curves come in contact with a straight line that corresponds to a specific wavelength a, in the third configuration.

The single photon generating apparatus related to the fifth configuration of the present invention is able to efficiently generate a photon pair of two specific wavelengths because, as a nonlinear optical medium on which the pumping light impinges, a nonlinear optical crystal is equipped, for which the angle made between the pumping light and the optical axis of the nonlinear optical crystal is set to an angle in which tuning curves come in contact with two straight lines that corresponds to two specific wavelengths a, b, in the third configuration.

The single photon generating apparatus related to the sixth configuration of the present invention is able to achieve a small-size single photon generating apparatus that does not need any optical alignment because, as a nonlinear optical medium on which the pumping light is incident, a waveguiding channel type nonlinear optical medium is equipped, in the third configuration.

The single photon generating apparatus related to the seventh configuration of the present invention is able to generate a photon pair in parallel to the pumping light because it is equipped with a pseudo-phase matching type nonlinear optical medium as a nonlinear optical medium on which the pumping light is incident, in any of the third through sixth configurations.

The single photon generating apparatus related to the eighth configuration of the present invention is able to obtain a gate device that can open or close in a shorter time than close or open time of the shutter because it is equipped with a plurality of shutters that open or close in a time difference shorter than the open or close time of the shutter as a gate device for controlling the emission of the signal photon, in any of the first through seventh configurations.

The single photon generating apparatus related to the ninth configuration of the present invention is able to coincide the open or close time of the gate with the arrival time of the signal photon to the gate device because it is equipped with an optical fiber that allows the signal photon generated from the photon pair to reach the gate device for controlling the emission of the photon, in any of the first through eighth configurations.

INDUSTRIAL APPLICABILITY

The single photon generating apparatus according to the present invention is useful as a single photon generating apparatus that is able to generate photons of a number lowering a specific number within a predetermined time after a clock pulse is built up, because it is equipped with a photon pair source for generating a pair of photons containing a signal photon and an idler photon that correlate in the generation time, a photon detector for detecting the incidence of the idler photon, a clock generator, a gate device controller for generating signals for opening or closing a gate device only by a frequency lowering a specific number of times within a predetermined time defined by the clock, and a gate device for opening or closing in response to the signal from the gate device controller.

What is claimed is:

1. A single photon generating apparatus comprising:
   a photon pair source configured to generate a photon pair consisting of a signal photon and an idler photon that correlate with a generating time;
   a photon detector configured to detect an incidence of the idler photon and to generate a signal in response to the detected incidence of the idler photon;
   a clock generator configured to generate a clock pulse;
   a gate device controller configured to generate a control signal in response to the signal received from the photon detector; and
   a gate device configured to open or close in response to the control signal received from the gate device controller to control an emission of the signal photon.
   wherein said gate device opens only for the control signal corresponding to a first occurrence of the detected incidence of the idler photon within a predetermined time interval in the clock pulse, said predetermined time interval being such a short time as to allow said gate device to output only a single photon, and to suppress an emission of a succeeding single photon.

2. The single photon generating apparatus of claim 1, wherein the photon pair source comprises:

a pumping light source and a nonlinear optical medium on which a pumping light from the pumping light source is incident.

3. The single photon generating apparatus of claim 2, wherein the nonlinear optical medium comprises:

a nonlinear optical crystal having an optical axis thereof set to a predetermined angle with respect to the pumping light such that tuning curves come in contact with a straight line having a predetermined wavelength.

4. The single photon generating apparatus of claim 2, wherein the nonlinear optical medium comprises:

a nonlinear optical crystal having an optical axis thereof set to a predetermined angle with respect to the pumping light such that tuning curves come in contact with two straight lines having a predetermined wavelength, respectively.

5. The single photon generating apparatus of claim 2, wherein the nonlinear optical medium is a wave-guide channel type nonlinear optical medium.

6. The single photon generating apparatus of claim 2, wherein the nonlinear optical medium includes a pseudo phase matching type nonlinear optical material.

7. The single photon generating apparatus of claim 1, wherein the gate device controller comprises:

a plurality of shutters configured to open and close by a time difference shorter than an open or close time of the shutters.

8. The single photon generating apparatus of claim 1, further comprising an optical fiber configured to allow the signal photon to reach the gate device.

9. A single photon generating apparatus comprising:

means for generating a photon pair consisting of a signal photon and an idler photon that correlate with a generating time;

means for detecting an incidence of the idler photon, and for generating a signal in response to the detected incidence of the idler photon;

means for generating a clock pulse;

means for generating a control signal in response to the signal received from the means for detecting; and means for opening and closing in response to the control signal received from the means for generating a control signal to control an emission of the signal photon, wherein said means for opening and closing opens only for the control signal corresponding to a first occurrence of the detected incidence of the idler photon within a predetermined time interval in the clock pulse, said predetermined time interval being such a short time as to allow said means for opening and closing to output only a single photon, and to suppress an emission of a succeeding single photon.

10. The single photon generating apparatus of claim 1, further comprising a preset counter configured to be set by the clock pulse and to reset when an output purse reaches a preset number.

* * * * *